United States Patent [19]

Hoshino et al.

[11] Patent Number: 4,529,659
[45] Date of Patent: Jul. 16, 1985

[54] MAGNETIC RECORDING MEMBER AND PROCESS FOR MANUFACTURING THE SAME

[75] Inventors: Mitsutoshi Hoshino; Akira Terada; Shungo Sugawara, all ot Mito, Japan

[73] Assignee: Nippon Telegraph & Telephone Public Corporation, Japan

[21] Appl. No.: 664,702

[22] Filed: Oct. 25, 1984

[30] Foreign Application Priority Data

Nov. 5, 1983 [JP] Japan .................. 58-208061
Mar. 27, 1984 [JP] Japan .................. 59-57453
May 16, 1984 [JP] Japan .................. 59-96340

[51] Int. Cl.$^3$ ............................................ G11B 5/72
[52] U.S. Cl. .................... 428/422; 360/134; 360/135; 360/136; 427/128; 427/131; 427/132; 428/694; 428/695; 428/900; 428/447; 428/450; 428/704
[58] Field of Search ............... 428/694, 900, 422, 421, 428/695, 704, 447, 450; 427/128, 131, 132, 301, 302, 316, 318, 404, 407.1, 387; 360/134–136

[56] References Cited

U.S. PATENT DOCUMENTS

| | | | |
|---|---|---|---|
| 3,810,874 | 5/1974 | Mitsch | 528/70 |
| 4,069,360 | 1/1978 | Yanagisawa | 427/131 |
| 4,085,137 | 4/1978 | Mitsch | 528/25 |
| 4,152,487 | 5/1979 | Yanagisawa | 428/694 |
| 4,267,238 | 5/1981 | Chernega | 428/422 |
| 4,268,556 | 5/1981 | Pedrotty | 428/422 |
| 4,307,156 | 12/1981 | Yanagisawa | 427/131 |
| 4,404,247 | 9/1983 | Burguette | 428/694 |
| 4,434,210 | 2/1984 | Nakejima | 428/405 |

Primary Examiner—Ellis P. Robinson
Attorney, Agent, or Firm—Darby & Darby

[57] ABSTRACT

Magnetic recording member having a magnetic storage layer covered by composite overlaying layers including an intermediate layer and a lubricant layer. The thin intermediate layer is formed by coating an aminosilane or epoxysilane compound directly or indirectly over the magnetic layer. The lubricant layer is formed over the intermediate layer by coating a lubricant made of a fluorinated hydrocarbon polymer having a terminal carboxyl or sulfonic acid group. The lubricant layer is chemically coupled with the intermediate layer by reacting the terminal carboxy or sulfonic acid group with the aminosilane or epoxysilane compound of the lubricant layer at room temperature or by heating, whereby the lubricant layer is stabilized to suppress deterioration of the lubricant layer and to suppress the reduction in lubricating property due to dispersion. With the stable lubricant layer according to the invention, abrasion of magnetic head slider slider and magnetic disc can be reduced and stiction of the head slider slider to the disc can be eliminated to preclude impairment of damage of the disc otherwise caused by head slider slider crash.

18 Claims, 6 Drawing Figures

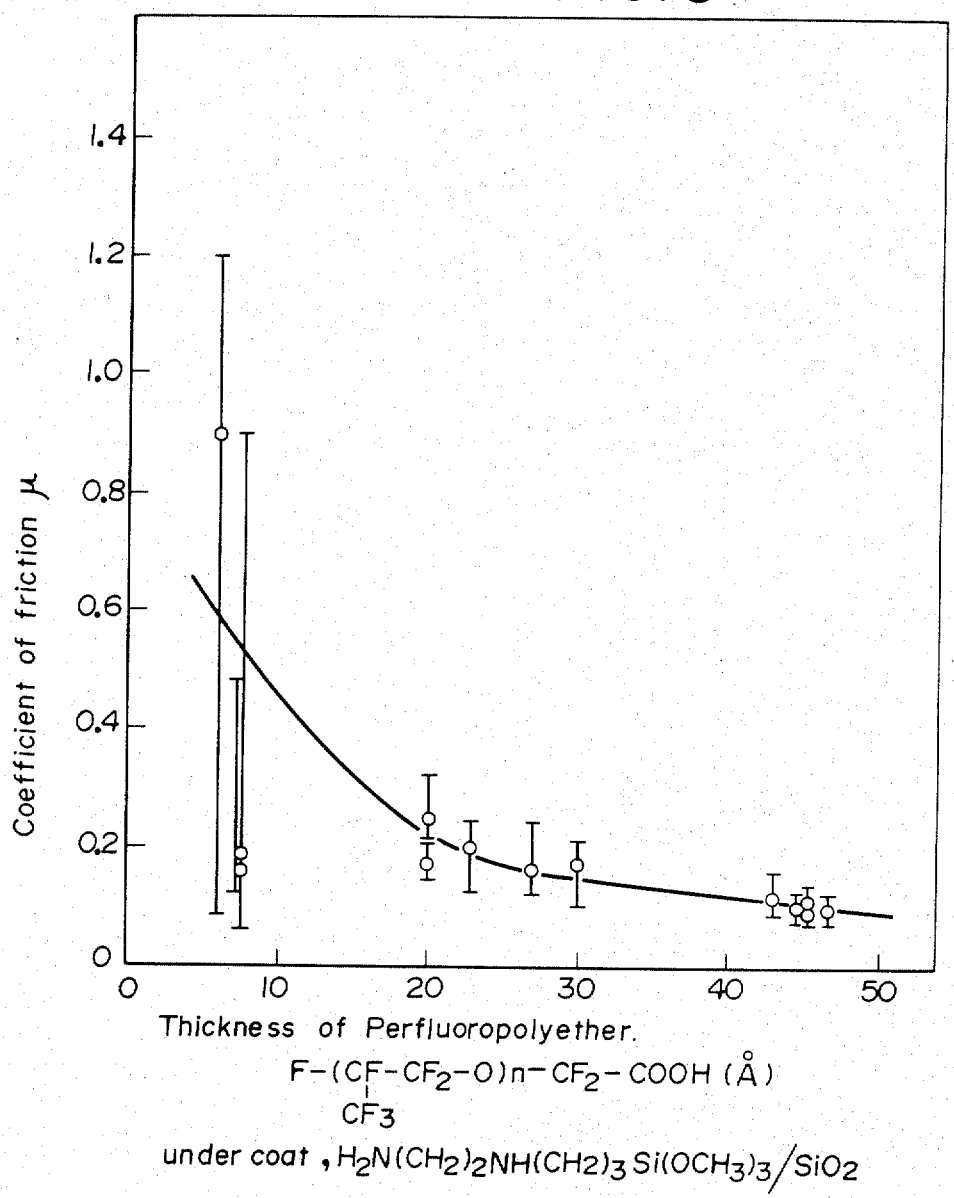

MAGNETIC RECORDING MEMBER AND PROCESS FOR MANUFACTURING THE SAME

BACKGROUND OF THE INVENTION

1. Field of Art

The present invention relates to a magnetic recording member and the process for manufacturing the same, wherein a lubricant layer laid on the top face of the magnetic recording member is chemically coupled through an intermediate layer of aminosilane or epoxysilane compound with the magnetic storage layer to form a permanent overlaying layer, and wherein the lubricant layer is uniformalized and improved in durability by setting or solidification.

2. Prior Art

A so-called contact start stop system (CSS system) is adopted generally as the magnetic disc drive system. In the CSS system, a recording-reproducing head slider contacts with the surface of a magnetic storage disc in the stand-by condition where the disc is stopped, and an air gap is formed between the head slider and the surface of the disc, upon rotation of the disc at a present speed, to disengage the head slider from the disc during the recording or reproducing operation. However, the disc and the head slider are apt to be abraded or weared at the time when the head slider takes off the surface of the disc, or the head slider contacts accidentally with the surface of the rotating disc during the recording or reproducing operation when it must be floated above the surface of the disc, whereby the surface of the head slider or the disc could be scratched or otherwise damaged. In order to protect the head slider and the disc from such abrasion-wear or scratch, particularly for the protection of storage medium on the magnetic recording disc, it has been proposed to cover the magnetic layer by a lubricant layer. However, if an excessively large amount of a liquid lubricant is applied on the top of the magnetic disc, stickness between the head slider and the surface of the disc becomes too high to cause a so-called head slider crash at the time of initiation of disc drive, leading to breakdown of the head slider or damage of the disc.

With the aim of overcoming the aforementioned problems, provisions were made to form the following lubricant layers on the magnetic discs. For instance, U.S. Pat. No. 4,069,360 discloses a magnetic record member protected by a combination of an amorphous inorganic oxide layer formed on the thin film of a magnetic metal medium and a silicon-containing lubricant layer coated over the amorphous inorganic oxide layer so that the lubricant adheres to the inorganic oxide layer, the lubricant layer containing a silicon base oil or silicon type surface coupling agent. U.S. Pat. No. 4,152,487 discloses a magnetic record member comprising a non-magnetic alloy disc substrate, a thin film of a magnetic metal medium applied on the substrate, and a protection polysilicate layer covering the magnetic metal medium. The protection polysilicate layer is made of a dehydration condensation polymerization product of tetraalkoxysilane or tetrahydroxysilane added with a stress relaxation agent. The stress relaxation agent is a silane coupling agent or a surface coupling agent having a functional groups selected from —COOH, —NH$_2$, —SH, —COOR, —NHR, =NH, —CHO, —NCO, —SiOH, Si—OR, Si—X,

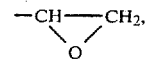

—CH$_2$OH,

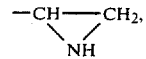

—O—CO—R and —OH, wherein R is an alkyl and X is a halogen.

It is known to use, as a lubricant for magnetic recording disc, fluorinated polyethers having high fluorine content and represented by the following general formula of:

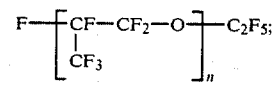

wherein n is an integer. Polymers of this type are commercially available from E. I. du Pont de Memours under the Trade Name "Krytox 143 Fluorinated Oils". Further, U.S. Pat. No. 4,268,556 discloses the use of a fluorinated polymer having alow molecular weight and containing known functional groups at the terminal ends thereof, as the lubricant for magnetic recording disc. The polymer is a polyether having a skeletal chain unit selected from —CF$_2$—O— or —CF$_2$—CF$_2$—O— and having a polar terminal group selected from —COOR, CONRR', —CH$_2$OH, —C$_6$H$_{12}$NRR', —COC$_n$F$_{2n+1}$, C(OH)$_2$C$_n$H$_{2n+1}$.

However, silicon oil base or other certain type lubricants tend to migrate from the center portion to the marginal portion of the magnetic disc during the operation when the disc is driven to rotate at high speed, resulting in uneven thickness of the lubricant layer. With such a lubricant layer having uneven thickness distribution, prevention of abrasion, head slider crash, or collision between the head slider and the magnetic recording medium of the disc cannot be effectively realized.

OBJECTS AND SUMMARY OF THE INVENTION

A primary object of the invention is to solve the aforementioned problems of the prior art devices and to provide a novel magnetic recording members and a process for manufacturing the same.

According to one aspect of the present invention, an aminosilane compound is coated on an inorganic oxide layer, for example a silicon oxide layer, applied on the magnetic storage medium of the disc so that the aminosilane compound is allowed to react with the inorganic oxide to be chemically coupled with the latter to form an aminosilane layer which is intimately jointed to the oxide layer by chemical bonds formed by condensation reaction. Thereafter, a lubricant made of a fluorinated hydrocarbon polymer having a terminal carboxyl group is coated on the surface of the aminosilane layer so that the amino group of the aminosilane compound and the carboxyl group of the polymer are coupled by the acid-base reaction to form a top lubricant layer of fluorinated hydrocarbon polymer which is securely retained by the intermediate aminosilane layer by the action of chemical bonds.

According to another aspect of the invention, an epoxysilane compound is used in place of the aminosilane compound. The expoxysilane compound reacts with the inorganic oxide, typically silicon oxide, to form an epoxysilane compound layer which is chemically coupled with the inorganic oxide layer through condensation reaction. The epoxysilane compound layer is then coated with a lubricant made of a fluorinated hydrocarbon polymer having a terminal carboxyl group so that the epoxy group of the epoxysilane compound is opened to react with the carboxyl group of the polymer to form a top lubricant layer of fluorinated hydrocarbon polymer chemically coupled with the epoxysilane compound of the intermediate layer.

According to a further aspect of the invention, the combination of the intermediate layer and the top lubricant layer may be overlaid on the magnetic storage layer indirectly or directly, with or without the interposed inorganic compound layer. However, it is preferred that a thin film of an inorganic compound is applied over the magnetic storage layer to prevent dislocation or dispersion by vaporization of the lubricant and to preclude increase in coefficient of friction or occurrence of head slider crash. By the provision of the interposed inorganic compound layer, durability and reliability of the magnetic recording disc may be improved. Inorganic compounds which may be used in the present invention include oxides, carbides and nitrides of silicon, titanium, aluminium, zirconium, magnesium, tungsten and bismuth.

BRIEF DESCRIPTION OF THE DRAWINGS

The above and other objects and advantages of the invention will be readily understood from the following detailed description of the invention with reference to appended drawings, wherein:

FIG. 6 is a graphical representation showing the change in coefficient of friction of a magnetic recording disc of the invention in terms of the thickness of the perfluoropolyether lubricant.

DETAILED DESCRIPTION OF THE INVENTION AND PREFERRED EMBODIMENTS THEREOF

Figure 1:
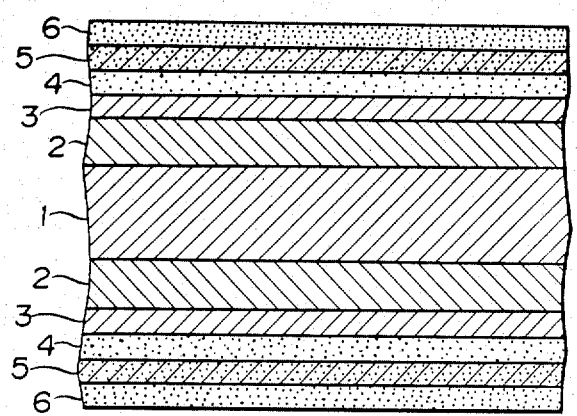
FIG. 1 is a sectional view showing a portion of an embodiment of the magnetic recording disc according to the invention.

Referring to FIG. 1 showing an embodiment of the magnetic recording member of the invention, the magnetic recording disc comprises an aluminium substrate 1 having a thickness of about 1.9 mm, an Almite (aluminite) layer 2 coated on the substrate 1 and having a thickness of about 10 μm, and a magnetic layer 3 coated on the polished Almite layer 2 and having a thickness of 0.1 to 0.2 μm and made of a magnetic composition mainly composed of iron. Although a thin sputtered film of $\gamma$-$Fe_2O_3$ is used as the magnetic layer 3 in the illustrated embodiment, any known magnetic materials known in the art may be used in lieu thereof, one preferred example being a thin plated alloy film of Co—Ni—P. The magnetic layer 3 is coated with a layer 4 of silicon oxide having a thickness of 0.01 to 0.03 μm, the silicon oxide layer being applied by spin coating followed by heat treatment. The magnetic recording disc further comprises an intermediate layer 5 of an aminosilane or epoxysilane compound coated on the silicon oxide layer 4 and having a thickness of about 10 angstroms, and a lubricant layer 6 coated on the intermediate layer 5 and having a thickness of about 10 to 40 angstroms, the lubricant layer 6 being composed of a fluorinated hydrocarbon polymer having a carboxyl group. According to an important feature of the invention, the lubricant layer 6 is chemically coupled through the aminosilane or epoxysilane compound of the intermediate layer 5 to the silicon oxide layer 4. Meanwhile, the aluminium substrate 1 including the Almite layer 2 has been finished to have an even and smooth surface such that the maximum roughness($R_{max}$) within a 0.3 mm long is in the order of not more than about 0.02 μm. The silicon oxide layer 4 is formed by spin-coating a solution of a tetraalkoxysilane, such as tetramethoxysilane or tetraethoxysilane, in ethanol or propanolor secondary butanol, over the Almite layer 2 followed by heat treatment. The silicon oxide layer 4 is made of an inorganic polymer having chemical units generally represented by $SiO_2$ and having a three-dimensional cross-linked structure including the covalent bonds Si—O and hydrogen bonds Si—OH- - - -O. In the partial structural formula Si—O and Si—OH- - - -O, the single dash "—" indicates a covalent bond and the three dashes or broken line "- - - -" indicates a hydrogen bond. The aminosilane compound layer 5 is formed by dehydration condensation reaction between silicon oxide and the aminosilane compound.

Figure 2:
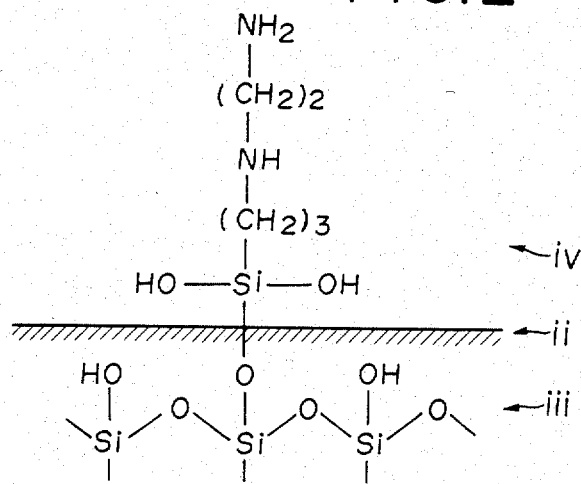
FIG. 2 is a diagram showing orientation of one aminosilane molecule coupled with the silicon oxide layer.

Orientation of an aminosilane molucule on the silicon oxide layer is diagrammatically shown in FIG. 2, wherein the inorganic silicon compound layer 4 covering the magnetic layer is denoted by iii, and the surface level of the layer 4 is schematically shown by ii. As shown by iv in FIG. 2, the hydrolysis product of N-β-aminoethyl-γ-aminopropyltrimethoxysilane $H_2N(CH_2)_2NH(CH_2)_3Si(OCH_3)_3$ reacts with a silanol group (SiOH) of silicon oxide to isolate water to form Si—O—Si bond. The reaction may be carried out at room temperature, and may be accelerated by heating to 100° C. to 200° C. to complete the reaction represented by the following reaction formula of:

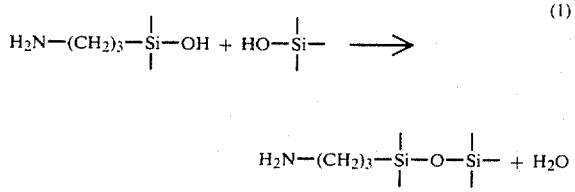

Aminosilane compounds which may be used in the invention include

N-β-aminoethyl-γaminopropyltrimethoxysilane,
N-β-aminoethyl-γ-aminopropylmethyldimethoxysilane,
N-β-aminoethyl-γ-aminopropyldimethylmethoxysilane,
γ-aminopropyltriethoxysilane,
γ-aminopropylmethyldiethoxysilane and
γ-aminopropyldimethylethoxysilane. The alkoxy group or groups of the aminosilane compounds may be one or more of methoxy or ethoxy groups. Representative examples of the aminosilane compounds which may be used in the present invention are as follows:

3-aminopropyltriethoxysilane,
3-aminopropyltrimethoxysilane,
3-aminopropylmethyldiethoxysilane,
3-aminopropyldimethylethoxysilane,
3-aminopropylmethyldimethoxysilane,
3-aminopropyldimethyldimethoxysilane,
bis(2-hydroxyethyl)-aminopropyltriethoxysilane,
bis(2-hydroxyethyl)-aminopropylmethyldiethoxysilane,
bis[3-(triethoxysilyl)propyl]amine,
bis[3-(trimethyldiethoxysilyl)propyl]amine,
bis[3-(trimethoxysilyl)propyl]ethylenediamine,
bis[3-(methyldimethoxysilyl)propyl]ethylenediamine,
N,N'-diethyl-3-aminopropyltrimethoxysilane,
N,N'-diethyl-3-aminopropylmethyldimethoxysilane,
N,N'-dimethylaminophenyltriethoxysilane,
N,N'-dimethylaminophenylmethyldiethoxysilane,
N-methylaminopropyltriethoxysilane,
N-methylaminopropylmethyldiethoxysilane,
methyl-3-[2-(3-trimethoxysilylpropylamino)ethylamino]-3-propionate,
methyl-3-[2-(3-methyldimethoxysilylpropylamino)ethylamino]-3-propionate,
β-trichlorosilyl-4-ethylpyridine,
triethoxysilylpropylethylcarbamate,
methyldiethoxysilylpropylethylcarbamate,
N-(tiethoxysilylpropyl) urea, N-(methyldiethoxysilylpropyl)urea,
1-trimethoxysilyl-2,1-(p,m-aminomethyl)phenylethane,
1-methyldimethoxysilyl-2,1-(p,m-aminomethyl)phenylethane,
trimethoxysilylpropylallylamine,
methyldimethoxysilylpropylallylamine,
trimethoxysilylpropyldiethylenetriamine,
methyldimethoxysilylpropyldiethylenetriamine,
N-(trimethoxysilylpropyl)ethylenediamine sodium triacetate,
N-(methyldimethoxysilylpropyl)ethylenediamine sodium triacetate,
p-aminophenyltrimethoxysilane,
p-aminophenylmethyldimethoxysilane,
aminoethylaminomethylphenethyltrimethoxysilane,
aminoethylaminomethylphenethylmethyldimethoxysilane,
N-β-(aminoethyl)-γ-aminopropyltrimethoxysilane,
N-β-(aminoethyl)-γ-aminopropylmethyldimethoxysilane,
N-β-(aminoethyl)-γ-aminopropyldimethylmethoxysilane,
N-phenyl-γ-aminopropyltrimethoxysilane, and
N-phenyl-γaminopropylmethyldimethoxysilane, As seen from the list set forth above, the compounds usable as the materials for the intermediate layer 5 include primary, secondary and tertiary amines and pyridines.

On the intermediate layer 5 of aminosilane compound, applied is a lubricant layer 6 made of a fluorinated hydrocarbon polymer having a terminal carboxyl group, with the intermediate layer 5 and the lubricant layer 6 being chemically coupled with each other by the acid-base reaction taking place between the amino groups of the aminosilane compound and the carboxyl groups in the lubricant layer. A perfluoroalkylpolyether may be used as the fluorinated hyrocarbon polymer containing a carboxyl group for forming the lubricant layer 6, and may be coated in the form of a solution containing a small quantity thereof in a quick-drying solvent, such as 1,1,2-trichloro-1,2,2-trifluroethane or perfluorotetrahydrofuran.

Figure 3:
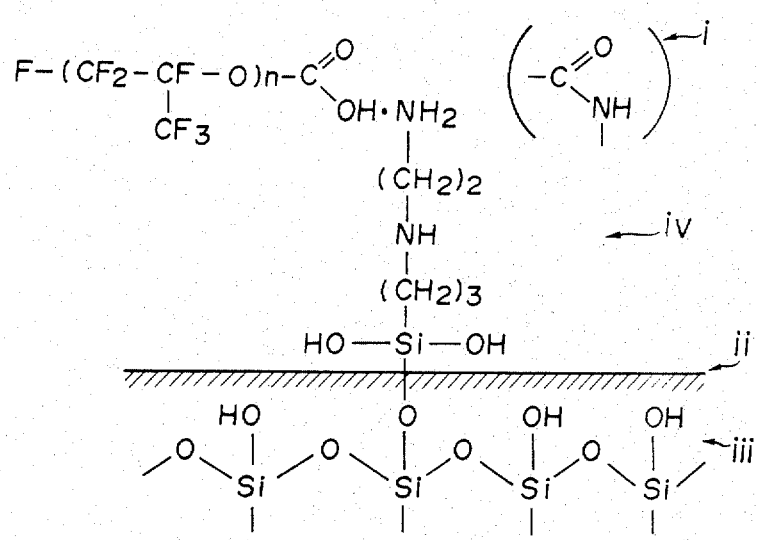
FIG. 3 is a diagram showing orientation of one perfluoropolyether molecule having a terminal carboxyl group chemically coupled to the aminosilane molecule shown in FIG. 2.

The lubricant may be coated by the spin coating process or spray coating process or may be applied by dipping process and wiping process. The thus applied lubricant adheres firmly over the magnetic recording member through the interposed aminosilane compound layer. FIG. 3 shows diagrammatically orientation of a molecule of a perfluoroalkylpoyether having a terminal carboxyl group which has been chemically coupled with the amino group of the aminosilane molecule (iv) of the intermediate layer 5 covering the magnetic storage layer. In FIG. 3, two types of chemical bond formed by the reaction between the carboxyl and amino groups, i.e. the salt form (—COOH.H$_2$N—) and the acid amide form (—NHCO—), are shown.

Figure 4:
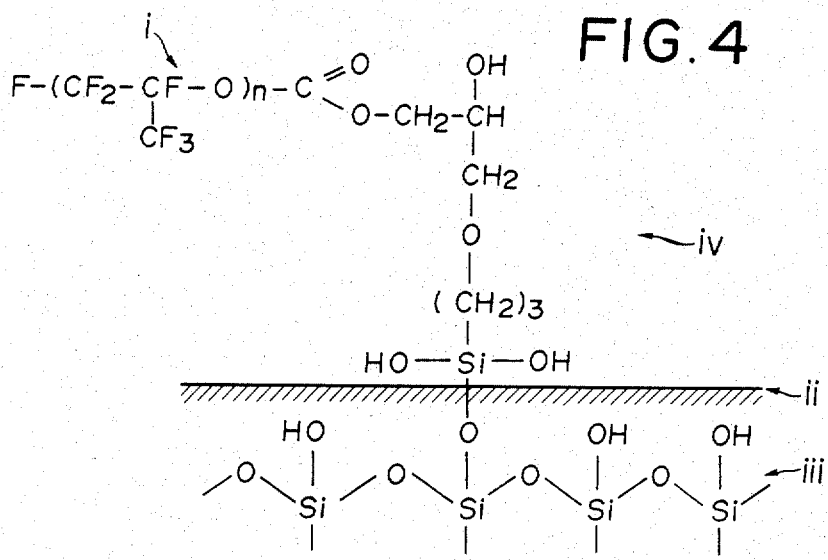
FIG. 4 is a diagram showing a silicon oxide layer, one epoxysilane molecule coupled with the silicon oxide layer, and one perfluoropropylene oxide polyether molecule coupled with the epoxysilane compound by the chemical reaction between the epoxy group of the epoxysilane compound the terminal carboxyl group of the polyether.

An epoxysilane compound may be used in place of the aminosilane compound. An epoxysilane compound is coated on the surface of the silicon oxide layer applied over the magnetic storage layer of the magnetic recording member, whereby a dehydration condensation reaction takes place between the silanol groups (Si—OH) of the epoxysilane compound and the silocon oxide layer to form a chemical bond represented by —Si—O—Si—. When a lubricant layer 6 made of a fluorinated hydrocarbon polymer having a carboxyl group is coated on the layer of epoxysilane compound, the epoxy groups in the epoxysilane compound is opened by the attach by the carboxyl groups in the lubricant layer 6 so that chemical bonds are formed. FIG. 4 shows diagrammatically the chemical bond or coupling between the epoxy silane compound (iv) and the perfluoroalkylpolyether (i) having a terminal carboxyl group.

Aliphatic epoxysilane compounds are represented by the following general formula of:

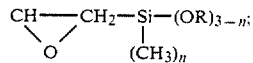

wherein n is zero or 1 and R is alkyl group.

Specific examples which may be used in the present invention are aliphatic epoxysilane compounds and alicyclic epoxysilane compounds as listed below:

γ-glycidoxypropyltrimethoxysilane,
γ-glycidoxypropyltriethoxysilane,
β-glycidoxyethyltrimetoxysilane,
β-glycidoxyethyltrietoxysilane,
γ-glycidoxypropylmethyldimethoxysilane,
γ-glycidoxypropylmethyldiethoxysilane,
β-glycidoxyethylmethyldimethoxysilane,
β-glycidoxyethylmethyldimethoxysilane
β-(3,4-epoxycyclohexyl)ethyltrimethoxysilane
β-(3,4-epoxycyclohexyl)ethyltriethoxysilane,
γ-(3,4-epoxycyclohexyl)propyltrimethoxysilane,
γ-(3,4-epoxycyclohexyl)propyltriethoxysilane
β-(3,4-epoxycyclohexyl)ethyldimethoxymethylsilane,
β-(3,4-epoxycyclohexyl)ethyldiethoxymethylsilane,
γ-(3,4-epoxycyclohexyl)propyldimethoxymethylsilane, and
γ-(3,4-epoxycyclohexyl)propyldiethoxymethylilane.

Other than the aminosilane and epoxysilane compounds, a silylation agent, such as hexamethyldisilazane $(CH_3)_3SiNHSi(CH_3)_3$, may be used to react with the residual hydroxyl groups so that the unreacted hydroxyl groups are converted to water-repellent trimethylsilyl groups. Examples of the sililation agents include trimethylchloro silane, trimethylmethoxysilane, N,N-dimethylaminotrimethylsilane, bis-(trimethylsilyl)acetamide, trimethylsilyl-N,N'-diphenylurea, bis-(trimethylsilyl) urea and N-trimethylsilylimidazole.

In addition, compounds having phenyldimethylsilyl groups or t-butyldimethylsilyl groups may also be used for improving the thermal stability of the product. The compounds derived from the aforementioned compounds by substituting hydrogens of the silyl group by fluorine atoms may also be used. The residual hydroxyl groups on the magnetic layer or the inorganic compound layer are thus converted to water-repellent functional groups by sililation reaction, as aforementioned, whereby a water-repellent surface having extremely low equilibrium water absorption at a given temperature and humidity is formed over the magnetic recording member.

The fluorinated hydrocarbon polymers having carboxyl groups, which may be used as the lubricant in the present invention, include perfluoropolyethers each having a terminal carboxyl group at one end or both ends and having repeating polyether main chain units of $-CF_2-O-$, $-CF_2-CF_2-O-$ or $CF(CF_3)-CF_2-O-$ and their blends, and copolymers of perfluoroformaldehyde with perfluoroethylene oxides each having a terminal carboxyl group.

The fluorinated hydrocarbon polymers having sulfonic acid groups, which may be used as the lubricant in the present invention, include perfluoropolyethers each having a terminal sulfonic acid group ($-SO_3H$) at one end or both ends and having repeating polyether main chain of $-CF_2-O-$, $-CF_2-CF_2-O-$ or $-CF(CF_3)-CF_2-O-$ and their blends, and copolymers of perfluoroformaldehyde with perfluoroethylene oxides each having a terminal sulfonic acid group.

In place of silicon oxide, titanium oxide, aluminium oxide, zirconium oxide, magnesium oxide, tungsten oxide, bismuth oxide and mixtures thereof may be used to form the protection inorganic compound layer 4. Other inorganic compounds which may be used for the same purpose include carbides, such as titanium carbide, aluminium carbide, zirconium carbide, magnesium carbide, tungsten carbide, bismuth carbide and mixtures thereof. Also usable are nitrides, such as titanium nitride, aluminium nitride, zirconium nitride, magnesium nitride, tungsten nitride, bismuth nitride and mixtures thereof.

A thin film of oxide for the inorganic compound layer 4 may be formed through spin coating process followed by thermal treatment, or by sputtering process, plasma jet process, anodic oxidation process, iron plating process and chemical vapor deposition process (CVD process). A thin film of carbide or nitride may be formed by sputtering process, plasma jet process, iron plating process and CVD process.

Although the embodiment described hereinbefore has a magnetic storage layer coated with a thin inorganic compounder layer 4 over which an intermediate layer of aminosilane or epoxysilane and a lubricant layer of fluorinated hydrocarbon polymer are overlaid, the thin inorganic compound layer 4 may be dispensed with and an aminosilane or epoxysilane compound layer 5 may be directly applied over the magnetic storage layer and a lubricant layer of fluorinated hydrocarbon polymer may be formed over the layer 5. In such a case, the silanol groups of the aminosilane or epoxysilane compound can be directly coupled with the magnetic layer. For example, when the magnetic layer 3 is made of γ-ferric oxide ($\gamma$-$Fe_2O_3$), the γ-ferric oxide ($\gamma$-$Fe_2O_3$) includes hydrogen spinel ferrite having a composition represented by $Fe_{2.5}O_{3.5}(OH)_{0.5}$. For example, the hydroxyl groups (OH) contained in the ferrite react with γ-aminopropyltriethoxysilane in accordance with the following condensation reaction equation:

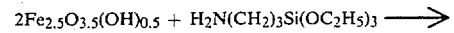

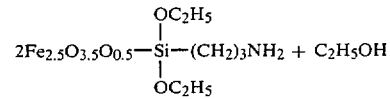

It is further estimated that hydroxyl groups are present on the surface of the γ-$Fe_2O_3$ layer while combining directly with the metallic element, similaryly as in a magnetic alloy including Co—Ni—P, and these hydroxyl groups are considered to react with the aminosilane or epoxysilane compound.

According to the present invention, a lubricant layer made of a fluorinated hydrocarbon polymer is chemically coupled with an intermediate layer made of an aminosilane or epoxysilane compound, the intermediate layer being directly coated on the magnetic layer or indirectly coated on the magnetic layer through an inorganic compound layer. With this structure, the lubricant is prevented from flowing or migrating outward to the rim or marginal portion of the disc, even when the magnetic recording disc is rotated at high speed during the recording or reproducing mode operation. As a result, the magnetic recording disc produced in accordance with the invention can be used in a stable running condition for a long operation period. Since the lubricant has been chemically stabilized in the magnetic recording member of the invention, increase in coefficient of friction due to deterioration of the lubricant per se can be eliminated, and damages of the head slider and magnetic recording member due to abrasion or collision can be sesurely prevented.

Figure 5:
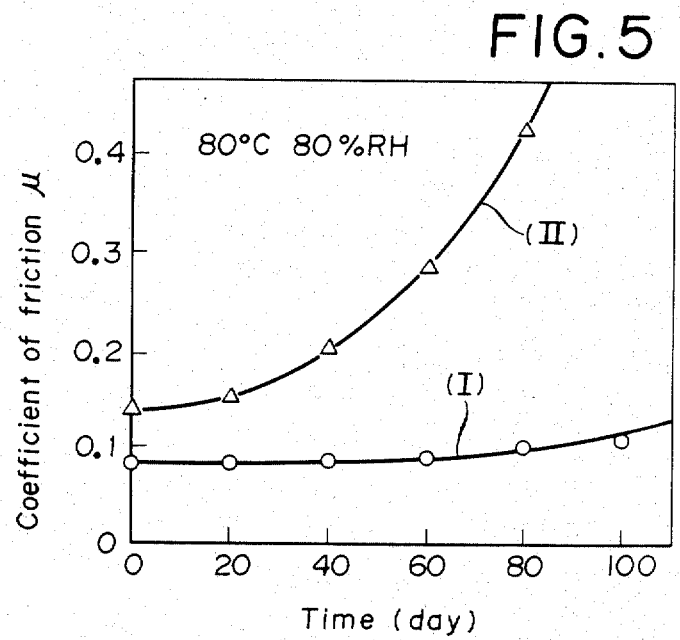
FIG. 5 is a graphical representation showing the change in coefficient of friction of a magnetic recording disc of the invention (I) and that of a disc of a Comparative Example (II) in terms of the lapse of time.

FIG. 5 shows the change in coefficient of friction between a head slider and a magnetic recording disc with the lapse of time, when the disc is allowed to stand in an environment of 80° C. and 80% RH. In FIG. 5, the curve denoted by (I) shows the change of a magnetic recording disc of the invention which has been produced by coating an aminosilane compound on a silicon oxide layer and then coating a perfluoroalkyl polyether having a carboxyl group to form a lubricant layer, whereas the curve denoted by (II) shows the change of a magnetic recording disc produced by coating the perfluoroalkylpolyether lubricant directly on the silicon oxide layer. As will be apparent by comparing the curve (I) with the curve (II), the change in coefficient of friction of the disc produced in accordance with the invention is extremely smaller than that of the conventional disc. It should be further understood that the lubricant made of the fluorinated hydrocarbon polymer has been chemically stabilized to affect advantageously on the coefficient of friction of the lubricant layer. It has been empirically proved that a similar favorable interelation between the coefficient of firction and the lapse of time is found in a magnetic disc produced by using an epoxysilane compound in place of the aminosilane compound.

The kinetic coefficient of friction and the static coefficient of friction were determined to indicate the friction factors of the magnetic disc produced by the invention. The kinetic friction coefficient ranged generally from 0.05 to 0.15. In the tests for the determination of the friction coefficents, a Winchester-type slider having a slider width of 0.30 mm and made of Mn-Zn ferrite was used under a loading of 6.0 grams. Each test specimen was held or allowed to stand in an air-conditioned chamber maintained at a temperature of 80° C. and at a relative humidity of 80% for a long time (as expressed by "lapse of time" in FIG. 5) to subject the same to ageing, and then the coefficient of friction thereof was measured. In addition, each test specimen was subjected to a contact start stop test (CSS test). In the CSS test, a magnetic recording disc having a diameter of 8¼ inches was repeatedly rotated and stopped at intervals of about 15 seconds. The maximum speed of the magnetic recording disc was set to about 18 m/sec to allow the magnetic head slider to take off the surface of the disc. Then, the rotational speed of the disc was reduced to land the head slider on the surface of the disc. The take-off and landing operations were repeated until a trace of abrasion formed by the magnetic head slider was visually observed on the surface of the disc to learn the number of repeated operation cycles until an appreciable abrasion trace was found. According to such a CSS test, the performance characteristics of a lubricant layer are appraised by the number of repeated operation cycles carried out until the appearance of abrasion trace.

FIG. 6 shows that the coefficient of friction of a lubricant layer depends on the thickness thereof. When a perfluoropolyether having a terminal carboxyl group was directly coated on a silicon oxide layer followed by ageing at a high temperature vacuum condition of 120° C. and $10^{-3}$ Torr, the thickness of the lubricant layer (perfluoropolyether layer) was decreased from the intitial thickness of 5 angstroms and the coefficient of friction was increased from the initial value of 0.2 to the final value of 0.6 after ageing for 30 minutes. On the contrary, after the same ageing test, a magnetic recording disc produced in accordance with the invention showed improved characteristics such that the decrease in thickness of the lubricant layer was so small that the thickness after ageing was 22 angstroms without no appreciable increase in coefficient of friction.

The present invention will be described more specifically with reference to some Examples thereof.

EXAMPLE 1

A magnetic recording disc was prepared by applying a magnetic layer of $\gamma$-$Fe_2O_3$ on a subtrate by sputtering, and then the magnetic layer was coated with a silicon oxide layer. A 0.0005 to 1 vol % solution of 3-aminopropyltriethoxysilane in ethanol was coated on the silicon oxide layer by spin coating. Then, a lubricant layer was formed on the top face of the disc by coating a 0.001 to 0.5 wet % solution of perfluoropropyleneoxide polyether having a terminal carboxyl group.

The coefficient of friction of the thus produced magnetic recording disc was measured to find that the coefficient of friction ranged from 0.05 to 0.15. Increase in coefficient of friction was so small that the coefficient of friction of the disc after being aged in an air-conditioned chamger maintained at 80° C. and at a relative humidity of 80% for 100 days was increased by 20% of the initial value. No abrasion trace by the magnetic head slider was observed on the disc after the disc had been subjected to 50,000 repeating CSS test cycles. No abrasion trace was observed on the magnetic head slider, as well. The stiction force between the disc and the magnetic head slider was low, even after the disc had been aged by allowing the same to stand in an air-conditioned chamber maintained at 80° C. and at a relative humidity of 80% for 100 days, so that stiction of the disc to the magnetic head slider had never observed.

A comparison test specimen was prepared by coating the same 3-aminopropyltriethoxysilane used in this Example on a silicon wafer to form coating layer on which a thin layer of the perfluoropropylenoxide polyether having a terminal carboxyl group was coated to form a lubricant layer. The polyether compound reacted readily with the silane at room temperature to be solidified. The stiction force exerted on the magnetic head slider by the magnetic recording disc attributed to the solidified polyether is reduced to about ⅓ to ¼ of the stiction force found in case where only the perfluoropropylenoxide polyether was coated directly on the silicon wafer. In view of the result of the comparison test described above, when the embodiment of the invention is applied for the production of a magnetic recording disc, a solidified lubricant layer is formed on the top face of the disc to lower the stiction force between the magnetic head slider and the disc in such an extent that the attraction force becomes about ⅓ to ¼ of a lubricant layer which is formed merely by coating perfluoropropylenoxide polyether having a terminal carboxyl group.

EXAMPLE 2

A 0.0005 to 1 vol % solution of N-methylaminopropyltriethoxysilane in ethanol was coated, by spin coating, on a silicon oxide layer applied on a magnetic storage layer formed by sputtering. The disc coated with the aminosilane compound was then heated at 100° C. for 15 minutes in a chamber maintained at that temperature. After cooling the disc to the room temperature, a solution containing 0.0001 to 0.5 wt % of perfluoropropyleneoxide polyether dissolved in perfluorotetrahydrofuran was coated by spin coating to form a lubricant layer. The thus produced magnetic recording disc had a coefficient of friction of 0.05 to 0.15. The magnetic head slider used for the determination of the coefficient of friction was a Winchester-type slider having a slider width of 0.30 mm and made of Mn-Zn ferrite. The increase in coefficient of friction after ageing at 80° C. and at a relative humidity of 80% for 100 days was not more than 25%. The stiction force after the ageing under the conditions as set forth above was 20 mN(milli newtons). No abnormality was observed both in the magnetic head slider and the magnetic recording disc even after the head slider and the disc had been subjected to repeated CSS cycles exceeding 70,000 cycles.

EXAMPLE 3

Similarly as in Example 1, a 0.0005 to 0.8 vol % solution of N,N-diethyl-3-aminopropyltrimethoxysilane in ethanol was coated on a magnetic recording disc by spin coating. The spin coated with the aminosilane compound was heated at 120° C. for 15 minutes in a chamber maintained at that temperature. After cooling the disc to the room temperature, a solution containing 0.0001 to 0.5 wt % of perfluoroethyleneoxide polyether dissolved in perfluorohexahydrofuran to form a lubricant layer.

The coefficient of friction of the thus produced disc was 0.05 to 0.15. the increase in coefficient of friction after the ageing test conducted at 80° C. and at a relative humidity of 80% for 100 days was so small as not more than 30%. The stiction force after the ageing under the conditions as set forth above was 15 mN. No abnormality was observed both in the magnetic head slider and the magnetic recording disc even after the head slider and the disc had been subjectd to repeated CSS cycles exceeding 100,000 cycles.

EXAMPLE 4

Similarly as in Example 1, a 0.0007 to 0.5 vol % solution of $\beta$-trichlorosilyl-4-ethylpyridine in ethanol was coated on a magnetic recording disc by spin coating. Thereafter, the disc was heated at 130° C. for 15-30 minutes in a chamber maintained at that temperature. A solution containing 0.002-0.5 wt % of perfluoroethyleneoxide polyether having a terminal carboxyl group and dissolved in perfluorotetrhydrofuran was coated on the top of the disc to form a lubricant layer.

The coefficient of friction of the thus produced disc was 0.05 to 0.15. The increase in coefficient of friction after ageing the disc at 80° C. and at a relative humidity of 80% for 100 days was so small as not more than 30%. The stiction force after the ageing under the conditions as set forth above was 15 mN. No abnormality was observed both in the magnetic head slider and the magnetic recording disc even after the head slider and the disc had been subjected to repeated CSS cycles exceeding 100,000 cycles.

EXAMPLE 5

A 0.0005 to 0.1 vol % solution of N-$\beta$-(aminoethyl)-$\gamma$-aminopropyl-trimethoxysilane in secondary butanol was coated, by spin coating, on an inorganic silicon oxide layer applied on a magnetic storage layer formed by sputtering. The disc coated with the aminosilane compound was then heated at 100° C. for 15 minutes in a chamber maintained at that temperature. After cooling the disc to the room temperature, a lubricant layer was formed by coating a solution containing 0.001 to 0.1 wt % of perfluoropolyether having carboxyl groups and represented by the formula of HOOCC-F$_2$—(O—C$_2$F$_4$)$_x$—(O—CF$_2$)$_y$—OCF$_2$COOH, wherein x+y<80, dissolved in perfluorotetrahydrofuran.

The coefficient of friction of the thus produced magnetic recording disc was 0.05 to 0.15.

The increase in coefficient of friction after ageing at 80° C. and at a relative humidity of 80% for 100 days was about 15% of the initial value. The stiction force between the magnetic head slider and the disc was 17 mN after being aged under the conditions as set forth above, and stiction of the disc to the magnetic head slider had never observed.

EXAMPLE 6

A magnetic recording disc was prepared by forming a thin Fe$_2$O$_3$ layer on which a 1.5% filtered solution of tetraethoxy silane in secondary butanol was coated by spin coating at a rotation speed of 1500 rpm. The disc coated with tetraethoxysilane was heated at a low temperature at an initial stage and then heated at 200° to 300° C. for 1 to 3 hours to form a silicon oxide layer on the magnetic storage layer.

Onto the silicon oxide layer coated was a 0.0002 to 0.1 vol % solution of N-$\beta$-(aminoethyl)-$\gamma$-aminopropyl-methyldimethoxysilane by spin coating at a rotation speed of 2000 rpm. Then, the disc was heated at 100° C. for 10 to 30 minutes in a clean air atmosphere. A lubricant layer was formed by coating a solution in perfluorotetrahydrofuran containing 0.0001 to 0.02 wt % of perfluoropropyleneoxide polyether having a carboxyl group by spin coating at a rotation speed of 2500 rpm on the layer of the aminosilane coating. In order to remove the solvent for the perfluoropropyleneoxide polyether, spin coating was continued for 5 to 10 minutes.

The coefficient of friction of the thus produced magnetic recording disc was 0.05 to 0.15. The coefficient of friction was increased by about 30% after the ageing test (80° C., 80% RH, 100 days). No abrasion trace was observed on the magnetic recording disc even after subjected to the CSS test cycles of 50,000 times repeatedly, and no abrasion trace was observed on the magnetic head slider, as well. The stiction force between the disc and the head slider was satisfactorily low after the disc was subjectee dot the ageing test (80° C., 80% RH, 100 days), and no appreciable sticking of the head slider to the disc was observed. The disc had a low coefficient of friction of 0.15 after it had been allowed to stand at 50° C. under 10$^{-3}$ Torr for 60 days, the coefficient of friction after vacuum conditioning being substantially equivalent to the initial value. On the other hand, a magnetic recording disc produced similarly as the disc of this example, except in that the spin coating of the aminosilane solution was omitted, had a coefficient of friction of 0.25.

The magnetic recording disc produced in accordance with this example was aged at 120° C. under 10$^{-3}$ Torr for 20 minutes, and then the thickness of the lubricant layer was measured by the XPS method and compared with the initial thickness thereof to find that the thickness after ageing was about 93% of the initial thickness. On the ther hand, the thickness of a lubricant layer formed by coating the same perfluoropropyleneoxidepolyether directly on the silicon oxide layer without the intermediate aminosilane layer was decreased to a value corresponding to 32% of the initial thickness by the same ageing.

According to the present invention, the thickness of a lubricant layer coated on the top of a magnetic recording disc can be precisely controlled within ±2 angstoms along the radial direction of the disc to form a lubricant layer excellent in uniformity in thickness, and the lubricant retention function is significantly improved.

REFERENCE EXAMPLE

The same solution of 3-aminopropyltriethoxysilane in ethanol as used in Example 1 was coated on an inorganic silicon layer of a magnetic recording disc, followed by heating at 100° C. for 15 minutes. After cooling to the room temperature, a 0.01 wt % solution of a perfluoroalkylpolyether having no carboxyl group was coated by spin coating to form a lubricant layer. The thus produced magnetic recording disc had a coefficient of friction of 0.3. The coefficient of friction of the disc after ageing (80° C., 80% RH, one day) could not be measured because the magnetic head slider stict to the disc. The result of the CSS test was not more than 500 cycles until a significant abrasion trace was found.

EXAMPLE 7

A 0.0001 to 0.5@ solution of γ-glycidoxypropyl-trimethoxysilane in 1-propanol was coated on a silicon oxide layer(SiO₂ layer) of a magnetic recording disc by spin coating, followed by heating at 100° C. for 15 minutes in a chamber maintained at that temperature. After cooling the disc to the room temperature, a 0.01 wt % solution of perfluoropropyleneoxide polyether having a terminal carboxyl group and dissolved in perfluorotetrahydrofuran was coated on the surface of the disc to form a lubricant layer.

The coefficient of friction of the thus formed magnetic recording disc was within the range of 0.05 to 0.15. The increase in coefficient of friction of the disc after ageing in an air-conditioned chamber at 80° C. and at a relative humidity of 80% for 100 days was so small as about 40%. No abrasion trace by the magnetic head slider was observed on the disc, even after subjected to repeated contact start stop (CSS) test cycles exceeding 50,000 cycles. No appreciable abrasion trace was found on the magnetic head slider, as well. No deterioration in recording and reproducing characteristics was found, and the disc retained the initial performance characteristics after being subjected to the ageing described above. The stiction force between the magnetic head slider and the disc after being aged at 80° C. and at 80% RH for 100 days in an air-conditioned chamber (theremo-hygrostat) maintained at that temperature and humidity was substantially equivalent to the initial stiction force with no appreciable increase. The following experiment was conducted to learn the stiction force between the magnetic head slider and the disc. The aforementioned epoxysilane compound was coated on a silicon wafer to form a film on which a thin layer of perfluoropropyleneoxide polyether was coated uniformly, and then the specimen was heated at 100° C. for 15 minutes. A solidified product was formed on the wafer. It was ascertained that the stiction force of the magnetic head slider and the wafer applied with the solidified product was about ⅓ to ¼ of the stiction force between the head slider and a wafer applied solely with the perfluoropropyleneoxide polyether of liquid form.

Similar results were obtained by using
γ-glycidoxypropyltriethoxysilane,
β-glycidoxyethyltrimethoxysilane and
β-glycidoxyethyltriethoxysilane in place of
γ-glycidoxypropyltridmethoxysilane.

EXAMPLE 8

A 0.001 to 0.5% solution of γ-glycidoxypropylmethyldimethoxysilane in n-butanol was coated on a silicon oxide layer carried on a magnetic recording disc by spin coating. The disc was heated at 100° C. for 15 minutes and then allowed to stand to cool to the room temperature. Thereafter, a solution of perfluoroehtyleneoxide polyether having acarboxyl group and dissolved in perfloroetetrahydrofuran was coated by spin coating to form a lubricant layer. The thus produced magnetic recording disc had a coefficient of friction of 0.06 to 0.15. The increase in coefficient of friction of the disc after being aged at 80° C. and at 80% RH for 100 days was not more than 25% of the initial value. No stiction or head slider crush between the magnetic head slider and the disc was observed after they were subjected to 70,000 repeated CSS test cycles. The stiction force of the disc exerted on the magnetic force after the ageing set force above was so small as in the order of 20 mN. The reaction product of the epoxysilane compound and the perfluoroalkyl polyether used in this Example become in the form of paste simply by heating to 60° to 70° C.

Similar results may be obtained by using β-glycidoxyethylethyldimethoxy silane and β-glycidoxyethylmethyldimethoxysilane in place of β-glycidoxypropylmethyldimethoxysilane used in this Example. The lubricant layer formed in accordance with this Example is in the form of paste, and the stiction force of the disc of this Example exerting on the magnetic head slider, before and after the ageing, is about ⅓ to ¼ of that of a lubricant layer made of the same perfluoroalkyleneoxide polyether of liquid form.

EXAMPLE 9

A 0.001 to 0.8 vol % solution of β-(3,4-epoxycyclohexyl)ethyltrimethoxysilane in isopropanol was coated on a silicon oxide layer carried on a magnetic recording disc by spin coating, followed by heating at 110° C. for 15 minutes in a chamber maintained at that temperature. The disc was allowed to stand to be cooled to the room temperature, and then a lubricant layer was formed on the top face thereof by coating a 0.015 wt % of solution of a perfluoroethyleneoxide polyether having a terminal carboxyl group and dissolved in polyfluorotetrahydrofuran. The coefficient of friction of the thus produced magnetic recording disc was 0.05 to 0.15. The coefficient of friction of the disc after being aged at 80° C. and at 80% RH for 100 days was increased by not more than 30% as compared to the initial coefficient of friction. The stiction force of the head slider exerting between the magnetic disc and the head slider before and after ageing for 100 days, was 15 mN. No abnormality was observed both in the disc and the magnetic head slider after they had been subjected to 100,000 CSS test cycles. The read-write characteristics and the performance characteristics of the disc were not lowered or adversely affected by the ageing.

Similar results were obtained by using γ-(3,4-epoxycyclohexyl)ethyltriethoxysilane, γ-(3,4-epoxycyclohexyl)propyltrimethoxysilane and γ-(3,4-epoxycyclohexyl)propyltriethoxysilane in place of β-(3,4-epoxycyclohexyl)ethyltriethoxysilane.

EXAMPLE 10

A 0.0001 to 0.5 vol % solution of β-(3,4-epoxycyclohexyl)ethyldimethoxymethylsilane in ethanol was coated on SiO$_2$ layer carried on a magnetic recording disc by spin coating. The disc was heated at 130° C. for 15 minutes in a chamber maintained at that temperature and then cooled to the room temperature. A lubricant layer was formed on the top of the disc by coating a 0.02 wt % solution of perfluoropropyleneoxide polyether having a carboxyl group and dissolved in perfluorodimethylcyclohexane by the wipe method (wherein the rotating disc was wiped by a tissue impregnated with the lubricant solution for several revolutions). The coefficient of friction of the thus produced disc was 0.05 to 0.15. The increase in friction coefficent of the disc after being aged at 80° C. and at 80% RH for 100 days was not more than 30% of the initial value, and the stiction force after ageing was 15 mN. No abrasion trace was found both on the magnetic recording disc and the magnetic head slider even after they were subjected to 100,000 repeated CSS test cycles, with no appreciable abnormality at the recording and reproducing operations.

Similar results were obtained by using β-(3,4-epoxycyclohexyl)ethyldiethoxymethyl silane, γ-(3,4-epoxycyclohexyl)propyldimethyoxymethylsilane and γ-(3,4-epoxycyclohexyl)propyldiethoxymethylsilane in place of β-(3,4-epoxycyclohexyl)ethyldimethoxymethylsilane.

EXAMPLE 11

Generally following to the prcedure as described in Example 7, a 0.001 to 0.1 vol % solution of γ-glycidoxypropyltriethoxysilane in sec-butanol was coated on a magnetic recording disc. The disc coated with the silane solution was then heated at 100° C. for 15 to 30 minutes. After being cooled to the room temperature, the disc was applied with a top lubricant layer by coating a 0.001 to 0.1 wt % solution of a perfluoropolyether having terminal carboxyl groups at both ends and dissolved in perflorotetrahydrofuran, the perfluoropolyether being represented by the formula of CF$_3$—(O—C$_2$F$_4$)$_x$—(O—CF$_2$)$_y$—OCF$_2$COOH, wherein $7 \leq x + y \leq 65$. The coefficient of friction of the thus produced magnetic recording disc was 0.04 to 0.16. The magnetic head slider used in the test for the determination of the coefficient of friction was an Mn-Zn ferrite type taper-flat slider having a slider width of 0.20 mm. The coefficient of friction was increased by about 15% of the initial value by ageing (80° C., 80% RH, 100 days). No abnormality was found both in the magnetic head slider and the magnetic recording disc even after they were subjected to repeated CSS test cycles exceeding 70,000 cycles. The magnetic head slider did not stick to the disc after the ageing test cycles.

A silicon wafer was coated with a relatively thick layer of the aliphatic epoxysilane compound used in this Example, and overcoated with a thin layer of the perfluoropolyether having terminal carboxyl groups at both ends. These compounds are readily solidified by heating. The stiction force of the lubricant layer formed in accordance with this Example is so small as about $\frac{1}{3}$ to $\frac{1}{4}$ of that of a lubricant layer formed by coating the liquid perfluoropolyether having terminal carboxyl groups at one end directly on the silicon wafer. Since the lubricant layer of the magnetic recording disc produced in accordance with this Example is solidified, the stiction force thereof is reduced to $\frac{1}{3}$ to $\frac{1}{4}$ of the liquid perfluoro-polyether having terminal carboxyl groups at both ends.

EXAMPLE 12

A magnetic storage layer carried by a substrate and polished to a mirror finish was coated with a 0.01 to 2% solution of tetraethoxysilane partially including condensation products of tetraethoxysilane and dissolved in ethanol, followed by heating at 200° C. for 3 hours to form an SiO$_2$ layer on the magnetic storage layer of the disc. A 0.001 to 0.5% solution of N-β-aminoethyl-γ-aminopropyltrimethoxysilane in 1-butanol was coated on the thus formed SiO$_2$ layer by spin coating, followed by heating at 100° to 150° C., to form a thin layer in which N-β-aminoethyl-γ-aminopropylsilyl groups are contained. After cooling to the room temperature, coated was a 0.001 to 0.5% solution of perfluoropropyleneoxide polyether having a terminal carboxyl group and dissolved in perfluorotetrahydrofuran, whereby a lubricant layer was formed.

The friction coefficient of the thus produced magnetic recording disc was 0.03 to 0.14. The magnetic disc used in the test for the determination of the coefficient of friction was Mn-Zn ferrite type taper-flat slider (Loading: 6.0 g) having a slider width of 0.25 mm. The increase in coefficient of friction of the disc after ageing at 80° C. and at 80% RH for 100 days in an air-conditioned chamber maintained at that temperature and at the relative humidity was acceptably small as about 40%. No abnormality both in the magnetic recording disc and the magnetic head slider was found even after they were subjected to repeated CSS test cycles of more than 50,000 cycles. The stiction force of the magnetic recording disc produced by this Example exerting on the magnettic head slider was about $\frac{1}{3}$ to $\frac{1}{4}$ of that of a disc produced by coating the same perfluoropropyleneoxidepolyether directly on the SiO$_2$ layer without the intermediate layer of aminosilane compound. Similar results were obtained by coating a thin layer of a different oxide of metal in place of the silicon oxide layer.

Tetrapropoxysilane, tetrabutoxysilane, methyltriethoxysilane and ethyltriethoxysilane may be used in place of tetraethoxysilane.

EXAMPLE 13

A layer of silicon carbide having a thickness of 200 to 300 angstroms was formed on a magnetic storage layer of a magnetic recording disc by sputtering. A 0.0001 to 0.5@ solution of γ-glycidoxypropyltrimethoxysilane in ethanol was coated on the silicon carbide layer to form a thin layer which was heated at 150° for 30 minutes. After cooling the disc to the room temperature, coated by spin coating on the thin epoxysilane layer was a 0.005 to 0.1% solution of perfluoroethyleneoxidepolyether having a terminal carboxyl group and dissolved in perfluorotetrahydrofuran. The disc was then heated at 150° C. for 30 minutes, whereby a lubricant layer was formed.

The coefficient of friction of the thus produced magnetic recording disc was 0.05 to 0.17. The properties of the disc after it was subjected ageing at 80° C. and at 80% RH for 100 days, were equivalent to those of the disc produced in Example 12. Titanium carbide, aluminium carbide, zirconium carbide, magnesium carbide, tungsten carbide and bismuth carbide may be used in place of silicon carbide.

EXAMPLE 14

A layer of silicon nitride having a thickness of 100 to 300 angstroms was formed on a magnetic storage layer of a magnetic recording disc by sputtering. A 0.01 to 0.5% solution of β-aminopropyltriethoxysilane in n-butanol was coated on the silicon nitride layer to form a thin layer which was heated at 150° C. for 30 minutes. After cooling the disc to the room temperature, coated by spin coating on the thin aminosilane layer was a 0.005 to 0.3% solution of a perfluoro-polyether having a terminal carboxyl group and dissolved in perfluorotetrahydrofuran, the perfluoropolyether being represented by $CF_3$—[CF ($CF_3$)—$CF_2$—O ]$_n$—$CF_2$—COOH, whereby a lubricant layer was formed.

The coefficient of friction of the thus produced magnetic recording disc was 0.05 to 0.15. The coefficient of friction after ageing (80° C., 80% RH, 100 days) was increased by only 40% of the initial value. No abnormality both in the magnetic recording disc and the magnetic head slider was found even after they were subjected to repeated CSS test cycles of more than 50,000 cycles. The sticking force of the magnetic recording disc produced by this Example stiction on the magnetic head slider was about ⅛ to ¼ of that of a disc produced by coating the same perfluoropolyether directly on the silicon nitride layer without the intermediate layer of aminosilane compound.

EXAMPLE 15

Without forming an inorganic compound layer on the magnetic storage layer of a disc 0.05 to 0.5% solution of 3-aminopropylmethyldiethoxysilane in ethanol was directly coated on the magnetic storage layer by spin coating, and heated at 130° C. for 15 minutes. After cooling, a lubricant layer was formed by coating a 0.005 to 0.1% solution of a perfluoropolyether having a terminal sulfonic acid group and represented by $CF_3$—[CF ($CF_3$)—$CF_2$—O]$_n$—$CF_2$—CF—($CF_3$)—$SO_3H$ on the top face of the disc by spin coating. The thus produced magnetic recording disc had the properties substantially equivalent to those of the disc produced by Example 12.

EXAMPLE 16

A thin intermediate layer was formed over a magnetic recording disc polished to a mirror finish by coating a solution, in an alcohol, containing an aminosilane compound represented by $H_2N(CH_2)_3$—Si(CH$_3$)$_y$—(OCH$_3$)$_{3-y}$ wherein y is an integer of 0 to 3, and futher containing 0.01 to 1.5% of a etraalkoxysilane by spin coating, followed by heating at 200° C. for an hour. After cooling, a 0.0005 to 0.05% solution of a perfluoropolyether having a terminal coarboxyl group and dissolved in perfluorotetrahydrofuran was coated on the thin intermediate layer to form a lubricant layer. The thus produced magnetic recording disc had the properties substantially equivalent to those of the disc produced by Example 12.

What is claimed is:

1. A magnetic recording member, comprising;
a magnetic layer applied on a substrate for said magnetic recording member;
an intermediate layer coated directly or indirectly over said magnetic layer and made of a functional silane compound selected from the group consisting of aminosilane compounds and epoxysilane compounds; and
a lubricant layer coated over said intermediate layer and made of a functional perfluoropolyether selected from the group consisting of perfluoropolyethers having terminal carboxyl groups and perfluoropolyethers having terminal sulfonic acid groups;
said intermediate layer and said lubricant layer being chemically coupled by the reaction between said silane compound and said functional perfluoropolyether.

2. The magnetic recording member as recited in claim 1, wherein said magnetic layer is one of selected from the group consisting of a thin sputtered oxide film of γ-$Fe_2O_3$ and a thin plated alloy film of Co—Ni—P and applied on a substrate polished to a mirror finish.

3. The magnetic recording member as recited in claim 1, wherein said aminosilane compounds include 3-aminopropyltriethoxysilane, N-methylpropyltriethoxysilane, N,N'-diethyl-3-aminopropyltrimethoxysilane, β-trichlorosilyl-4-ethylpyridine, N-β-aminoethyl-γ-aminopropyltrimethoxysilane, and N-β-aminoethyl-γ-aminopropylmethyldimethoxysilane, and wherein said epoxysilane compounds include γ-glycidoxypropyltriethoxysilane, γ-glycidoxypropylmethyldimethoxysilane, γ-(3,4-epoxycyclohexyl)-ethyltrimethoxysilane, β-(3,4-epoxycyclohexyl)-ethyldimethoxymethylsilane, and γ-glycidoxypropyltriethoxysilane.

4. The magnetic recording member as recited in claim 1, wherein said perfluoropolyethers having terminal carboxyl groups have repeating polyether main chain units selected from the group consisting of —$CF_2$—O—, —$CF_2$—$CF_2$—O— and —CF($CF_3$)—$CF_2$—O—, and wherein said perfluoropolyethers having terminal sulfonic acid groups have repeating polyether main chain units selected from the group consisting of —$CF_2$—O, —$CF_2$—$CF_2$—O— and —CF($CF_3$)—$CF_2$—O— and said perfluoropolyether having terminal sulfonic acid group being perfluoropropylpolyether have terminal sulfonic acid group.

5. A magnetic recording member, comprising;
a magnetic layer applied on a substrate for said magnetic recording member;
an inorganic compound layer;
an intermediate layer coated on said inorganic compound layer and made of a functional silane compound selected from the group consisting of aminosilane compounds and epoxysilane compounds; and
a lubricant layer coated over said intermediate layer and made of a functional perfluoropolyether selected from the group consisting of perfluoropolyethers having terminal carboxyl groups and perfluoropolyethers having terminal sulfonic acid groups;
said inorganic compound layer being chemically coupled with said intermediate layer; and
said intermediate layer and said lubricant layer being chemically coupled by the reaction between said silane compound and said functional perfluoropolyether.

6. The magnetic recording member as recited in claim 5, wherein said inorganic compound layer is made of an oxide selected from the group consisting of oxides of silicon, titanium, aluminium, zirconium, magnesium, tungsten and bismuth.

7. The magnetic recording member as recited in claim 5, wherein said inorganic compound layer is made of a carbide selected from the group consisting of carbides of silicon, titanium, aluminium, zirconium, magnesium, tungsten and bismuth.

8. The magnetic recording member as recited in claim 5, wherein said inorganic compound layer is made of a nitride selected from the group consisting of nitrides of silicon, titanium, aluminium, zirconium, magnesium, tungsten and bismuth.

9. The magnetic recording member as recited in claim 5, wherein said magnetic layer is one of selected from the group consisting of a thin sputtered oxide frilm of $\gamma$-Fe$_2$O$_3$ and a thin plated alloy film of Co—Ni—P and applied on a substrate polished to a mirror finish.

10. The magnetic recording member as recited in claim 5, wherein said aminosilane compounds include 3-aminopropyltriethoxysilane, N-methylpropyltriethoxysilane, N,N'-diethyl-3-aminopropylmethoxysilane, $\beta$-trichlorosilyl-4-ethylpyridine, N-$\beta$-aminoethyl-$\gamma$-aminopropyltrimethoxylsilane, and N-$\beta$-aminoethyl-$\gamma$-aminopropylmethyldimethoxysilane, and wherein said epoxysilane compounds include $\gamma$-glycidoxypropyltriethoxysilane, $\gamma$glycidoxypropylmethyldimethoxysilane, $\beta$-(3,4-epoxycyclohexyl)ethyltrimethoxysilane, $\beta$-(3,4-epoxycyclohexyl)ethyldimethoxymethylsilane, and $\gamma$-glycidoxypropyltriethoxysilane.

11. The magnetic recording member as recited in claim 5, wherein said perfluoropolyethers having terminal carboxyl groups have repeating polyether main chain units selected from the group consisting of —CF$_2$—O—, —CF$_2$—CF$_2$—O— and —CF(CF$_3$)—CF$_2$—O—, said perfluoropolyethers being selected from copolymers of perfluoropropyleneoxide and perfluoroethyleneoxide, and wherein said perfluoro-polyethers having terminal sulfonic acid group have repeating polyether main chain units selected from the group consisting of —CF$_2$—O—, —CF$_2$—CF$_2$—O— and —CF(CF$_3$)—CF$_2$—O—, and said perfluoropolyether having terminal sulfonic acid group being perfluoropropylpolyether having terminal sulfonic acid group.

12. A process for manufacturing a magnetic recording member, comprising the steps of:
coating a solution in alcohol of a functional silane compound selected from the group consisting of aminosilane compounds and epoxysilane compounds on a surface of a magnetic layer;
heating the coated layer at 100° to 120° C. for 10 to 30 minutes to polymerize said functional silane compound by condensation polymerization thereby to form an intermediate layer made of a polymerized silane compound having a residual functional group;
coating a lubricant on said intermediate layer, said lubricant being made of a perfluoropolyether having functional groups and selected from the group consisting of perfluoropolyethers having terminal carboxyl groups and perfluoropolyethers having terminal sulfonic acid groups; and
reacting the residual functional groups of said polymerized silane compound with said terminal carboxyl groups or sulfonic acid groups of said perfluoropolyethers to form chemical bonds therebetween to form a lubricant layer chemically coupled to said intermediate layer.

13. The process for manufacturing a magnetic recording member as recited in claim 12, wherein said aminosilane compounds include 3-aminopropyltriethoxysilane, N-methylpropyltriethoxysilane, N,N'-diethyl-3-aminopropylmethoxysilane, $\beta$-trichlorosilyl-4-ethylpyridine, N-$\beta$-aminoethyl-$\gamma$-aminopropyltrimethoxysilane, and N-$\beta$-aminoethyl-$\gamma$-aminopropylmethyldimethoxysilane, and wherein said epoxysilane compounds include $\gamma$-glycidoxypropyltriethoxyilane, $\gamma$-glycidoxypropylmethyldimethoxysilane, $\beta$-(3,4-epoxycyclohexyl)-ethyltrimethoxysilane, $\beta$-(3,4-epoxyclohexyl)-ethyldimethoxymethylsilane, and $\gamma$-glycidoxypropyltriethoxysilane.

14. The process for manufacturing a magnetic recording member as recited in claim 12, wherein said perfluoropolyethers having terminal carboxyl groups have repeating polyether main chain units selected from the group consisting of —CF$_2$—O—, CF$_2$—CF$_2$—O— and —CF(CF$_3$)—CF$_2$—O—, and said perfluoropolyethers having terminal carboxyl groups being selected from the group consisting of poly(hexafluoropropyleneoxide) having terminal carboxyl groups, (poly(tetrafluoroethyleneoxide) having terminal carboxyl group, perfluoropropylpolyethers having terminal carboxyl groups and hexafluoropropyleneoxide/tetrafluoroethyleneoxide copolymers having terminal carboxyl group, and wherein said perfluoro-polyethers having terminal sulfonic acid groups have repeating polyether main chain units selected from the group consisting of —CF$_2$—O—, —CF$_2$—CF$_2$—O— and —CF(CF$_3$)—CF$_2$—O—, and said perfluoropolyether having terminal sulfonic aid group being perfluorohexafluoropropyleneoxide polyether having terminal sulfonic acid group.

15. A process for manufacturing a magnetic recording member, comprising the steps of:
forming a thin inorganic compound layer on a magnetic layer;
coating a alcoholic solution dissolved functional silane compound selected from the group consisting of aminosilane compounds and epoxysilane compounds on a surface of said inorganic compound layer;
heating the coated layer at 100° to 120° C. for 10 to 30 minutes to polymerize said functional silane compound by condensation polymerization thereby to form an intermediate layer made of a polymerized silane compound having residual functional groups;
coating a lubricant on said intermediate layer, said lubricant being made of a perfluoropolyether having functional groups and selected from the group consisting of perfluoropolyethers having terminal carboxyl groups and perfluoropolyethers having terminal sulfonic acid groups; and
reacting the residual functional groups of said polymerized silane compound with said terminal carboxyl groups or sulfonic acid groups of said perfluoropolyethers to form chemical bonds therebetween to form a lubricant layer chemically coupled to said intermediate layer.

16. The process for manufacturing a magnetic recording member as recited in claim 15, wherein said inorganic compound layer is made of an inorganic compound selected from the group consisting of oxides, carbides and nitrides of silicon, titanium, aluminum, magnesium, zirconium, tungsten and bismuth.

17. The process for manufacturing a magnetic recording member as recited in claim 15, wherein aminosilane compounds include 3-aminopropyltriethoxysilane, N-methylpropyltriethoxysilane, N,N'-diethyl-3-aminopropylmethoxysilane, $\beta$-trichlorosilyl-4-ethylpyridine, N-$\beta$-aminoethyl-$\gamma$-aminopropyltrimethoxysilane, and N-$\beta$-aminoethyl-$\gamma$-aminopropylmethyldimethoxysilane, and wherein said epoxysilane compounds include β-glycidoxypropyltriethoxysilane, γ-glycydoxypropylmethyldimethoxisilane, β-(3,4-epoxycyclohexyl)-ethyltrimethoxysilane, β-(3,4-epoxycyclohexyl)-ethyldimethoxymethylsilane, and γ-glycidoxypropyltriethoxysilane.

18. The process for manufacturing a magnetic recording member as recited in claim 15, wherein said perfluoropolyethers having terminal carboxyl groups have repeating polyether main chain united selected from the group consisting of $-CF_2-O-$, $-CF_2-CF_2-O-$ and $-CF(CF_3)-CF_2-O-$, said perfluoropolyethers having terminal carboxyl groups being selected from the group consisting of poly(hexafluoropropyleneoxide) having terminal carboxyl groups, poly(tetrafluoroethyleneoxide) having terminal carboxyl group polyperfluoroformaldehyde having terminal carboxyl group and hexafluoropropylene oxide/tetrafluoroethylene oxide copolymers having terminal carboxyl groups, and wherein said perfluoropolyethers having terminal sulfonic acid groups have repeating polyether main chain units selected from the group consisting of $-CF_2-O-$, $-CF_2-CF_2-O-$ and $-CF(CF_3)-CF_2-O-$, and said perfluoropolyether having terminal sulfonic acid group being perfluorohexafluoropropyleneoxide polyether having terminal sulfonic acid group.

* * * * *